United States Patent [19]

Kando

[11] Patent Number: 4,852,771

[45] Date of Patent: Aug. 1, 1989

[54] PARTS SUPPLY HOPPER

[75] Inventor: Akiyoshi Kando, Uozu, Japan

[73] Assignee: Yoshida Kogyo K. K., Tokyo, Japan

[21] Appl. No.: 181,395

[22] Filed: Apr. 14, 1988

[30] Foreign Application Priority Data

Apr. 17, 1987 [JP] Japan .............................. 62-58899[U]

[51] Int. Cl.$^4$ .............................................. B67D 5/64
[52] U.S. Cl. .................................... 222/169; 221/186
[58] Field of Search ................................ 222/167–170, 222/454, 456, 457, 353, 362, 367, 172, 171; 221/174, 186, 288, 263; 111/74, 77, 90

[56] References Cited

U.S. PATENT DOCUMENTS

| | | | |
|---|---|---|---|
| 1,521,819 | 1/1925 | Lenz ..................................... | 221/174 |
| 1,659,230 | 2/1928 | Zacharias ........................ | 222/457 X |
| 1,741,033 | 12/1929 | Neidlinger ........................... | 221/263 |
| 3,090,532 | 5/1963 | Robson ................................ | 222/456 |
| 3,680,744 | 8/1972 | Daniels, Jr. ..................... | 222/454 X |

FOREIGN PATENT DOCUMENTS

| | | |
|---|---|---|
| A0176285 | 2/1986 | European Pat. Off. . |
| A2461696 | 7/1976 | Fed. Rep. of Germany . |
| A1475352 | 2/1967 | France . |
| 60-122719 | 8/1985 | Japan . |
| A1464856 | 2/1977 | United Kingdom . |

*Primary Examiner*—Joseph J. Rolla
*Assistant Examiner*—David H. Bollinger
*Attorney, Agent, or Firm*—Hill, Van Santen, Steadman & Simpson

[57] ABSTRACT

A parts supply hopper operatively associated with a parts feeder for supplying the latter with a predetermined amount of articles, includes a generally cup-shaped container held in an angular position and rotatably at least through an angle of 180 degrees, and a partition wall disposed in the container so as to define therebetween upper and lower chambers disposed on opposite sides of the partition wall. The partition wall has a transfer aperture communicating between the upper and lower chambers. The container has a discharge outlet opening defined in its peripheral wall and communicating with the lower chamber, the discharge outlet opening being located in diametrically opposed relation to the transfer aperture.

8 Claims, 5 Drawing Sheets

PARTS SUPPLY HOPPER

BACKGROUND OF THE INVENTION

1. Field of the Invention

This invention relates to a parts supply hopper operatively associated with a parts feeder device for supplying the latter with small parts or articles at predetermined rates.

2. Prior Art

There are known many different types of parts feeders, a typical example of which is a vibratory type bowl feeder adapted to receive randomly positioned articles from a hopper and deliver properly oriented articles one at a time through a supply chute to a processing station on an automatic assembly production line such as in a slide fastener manufacturing factory.

The bowl parts feeder receives predetermined amounts of articles manually at such a time point and such a frequency as seen fit by the operator, or alternatively automatically from a suitable parts hopper such as that disclosed for example in Japanese Utility Model Laid-Open Publication 60-122719.

The prior art hopper device comprises a rotary drum having a discharge outlet adjacent to its upper peripheral edge and rotatably supported on rollers driven by two separate motors through a pair of movable gears. The drum is provided along its inner wall surface with a helically shaped guide track adapted to transfer articles from the bottom floor of the drum upwardly towards the upper edge thereof until the articles overflow and fall by own gravity into a parts feeder. Such drum hopper is structurally complicated and bulky, and has a further drawback in that due to a large head (namely, the distance between the upper edge of the drum hopper in operative position and the bottom wall surface of the vibratory parts feeder) the supply of articles from the hopper is apt to drop onto random aspects in the feeder and at such a high speed that individual articles would impinge upon one another or bounce back from the drum floor to strike and disturb the stream of oriented articles in the discharge chute, or would often even fly out of the bowl.

SUMMARY OF THE INVENTION

With the foregoing drawbacks of the prior art in view, it is the primary object of the present invention to provide a parts supply hopper operatively associated with a parts feeder device, the supply hopper being constructed compact and at a minimum cost and highly reliable in operation.

The invention also seeks to provide a parts supply hopper incorporating structural features which will enable a predetermined rate of articles to be delivered smoothly along a predetermined track until the last piece of article is cleared.

More specifically, the parts supply hopper according to the invention comprises a generally cup-shaped container rotatably disposed in an inclined plane with its open end facing upwardly and movable at least through an angle of 180 degrees about its own longitudinal central axis; a partition wall disposed in said container and lying in parallel spaced relation to a bottom wall of said cup-shaped container so as to define, jointly with said container, a pair of upper and lower chambers disposed one on each side of said partition wall, said partition wall having a transfer aperture communicating between said upper and lower chambers; and a peripheral wall of said cup-shaped container having a discharge outlet opening communicating with said lower chamber and located in diametrically opposed relation to said transfer aperture.

The above objects and features of the invention will be more apparent from the following detailed description taken in conjunction with the accompanying drawings which illustrate by way of example certain preferred embodiments and in which like reference numerals refer to like and corresponding parts throughout the several views.

DETAILED DESCRIPTION OF THE INVENTION

Figure 1:
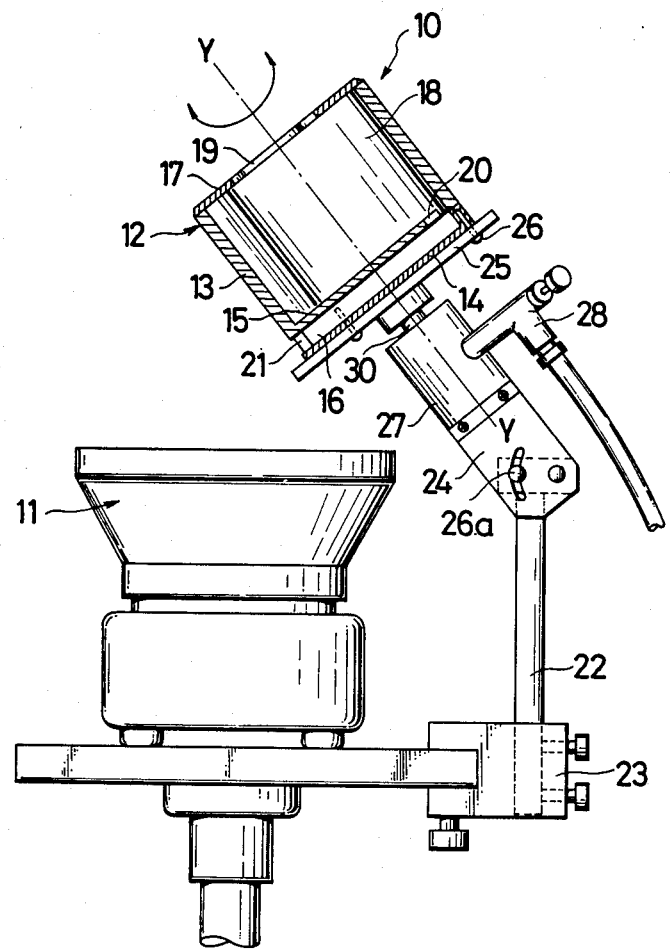
FIG. 1 is a front elevational, partly cross-sectional, view of a parts supply hopper shown operatively associated with a parts feeder.

Referring now to the drawings and FIG. 1 in particular, there is shown a parts supply hopper 10 operatively associated with a parts feeder 11 of conventional vibratory bowl construction installed for example on an automatic slide fastener assembly line.

The hopper 10 comprises a generally cup-shaped container 12 made preferably of a transparent synthetic resin and having a peripheral wall 13 and a bottom wall 14. A partition wall 15 integral with the peripheral wall 13 is provided adjacent to and in parallel with the bottom wall 14 to define therewith a relatively small lower chamber 16.

The partition wall 15 also defines with a cover plate 17 a relatively large upper chamber 18. The cover plate 17 has a central opening 19 communicating with the upper chamber 18 and adapted to receive a supply of parts such as fastener sliders, into the upper chamber 18 which serves as a reservoir. The cover plate 17 may be integral with the container 12, or may be dispensed with if the height of the peripheral wall 13 is greater than the diameter of the container 12.

Figure 3:
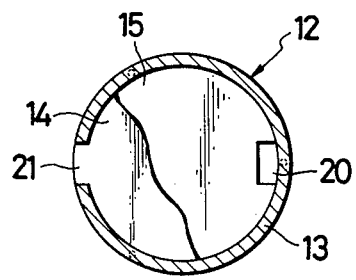
FIG. 3 is a transverse cross-sectional view of the hopper.

A transfer aperture 20 is formed in the partition wall 15 at a marginal circumferential portion thereof as better shown in FIG. 3, which aperture 20 is adapted to transfer a predetermined amount of parts from the upper chamber 18 to the lower chamber 16.

A discharge outlet opening 21 is formed in a portion of the peripheral wall 13 surrounding the lower chamber 16, which portion lies in diametrically opposed relation to or 180° apart from the transfer aperture 20 as better shown in FIG. 3, and through which an inventory of parts collected in the lower chamber 16 is discharged into the parts feeder 11 in a manner to be hereafter described.

The hopper 10 is supported in place via a vertical column 22 secured by suitable clamps 23 to the parts feeder 11.

An angle adjusting means or mechanism 24 is connected at one or the lower end to the vertical column 22 and at the other or the upper end to a flange 25 which is secured by pins 26 to the bottom wall 14 of the cylindrical container 12. The angle adjusting mechanism 24 is pivotal via suitable link 26a to tilt or incline the container 12 at a desired angle with respect to the general plane of the parts feeder 11. With the container 12 held in such angular position, the discharge outlet opening 21 when registered as later described with the parts feeder 11 confronts the latter across a minimum spacing or head so as to eliminate the possibility of parts bouncing back out of the parts feeder 11 or interfering the orderly array of parts in its transfer track not shown.

Figure 2:
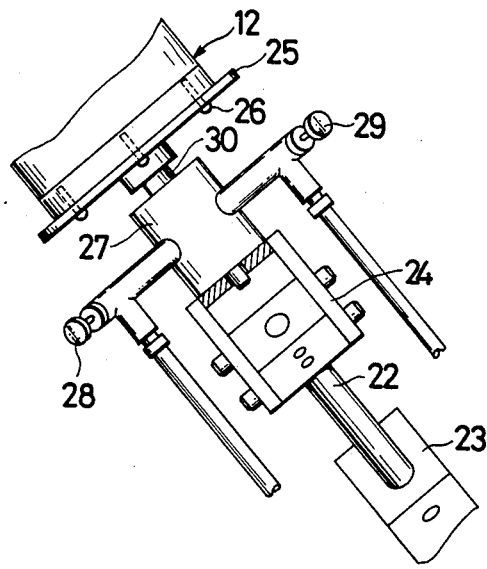
FIG. 2 is an oblique plan view of the hopper of FIG. 1.

Designated at 27 and better shown in FIG. 2 is an air rotary actuator connected to an air compressor not shown and adapted to supply compressed air through a pair of valves 28 and 29 to the angle adjusting mechanism 24 to rotate the container 12 about its inclined longitudinal axis Y-Y via drive shaft 30 alternately clockwise and counterclockwise through an angle of 180° in the direction of the arrows.

Figure 4:
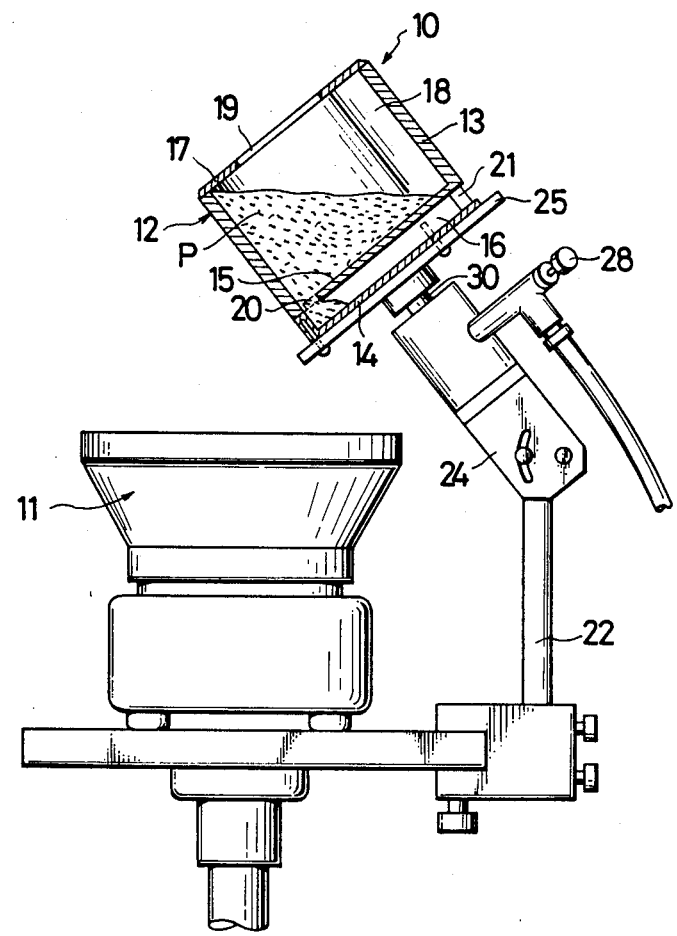
FIGS. 4 and 5 are views similar to FIG. 1 but showing the hopper in two respective modes of operation.

Referring now to FIG. 4 which illustrates the transfer mode of operation of the hopper 10, in which the parts P in the upper chamber 18 are transferred at a predetermined rate into the lower chamber 16 through the transfer aperture 20 when this aperture is oriented to the lowermost position upon completion of 180° rotation of the container 12 in one or forward direction.

Figure 5:
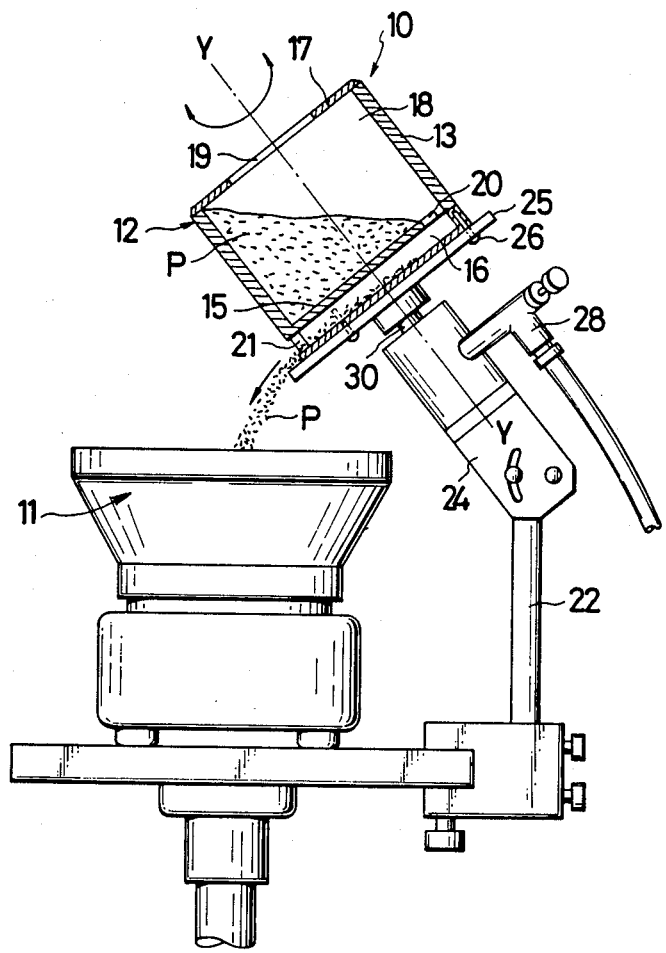

Rotating the container 12 back in the other or reverse direction through an angle of 180° brings the discharge outlet opening 21 down to its lowermost position registering with the inlet of the parts feeder 11, in which position the parts P collected in the lower chamber 16 are allowed to fall by own gravity into the parts feeder 11 as shown in FIG. 5 illustrating the discharge mode of operation. During this operation, the parts P in the upper chamber 18 are prevented from running into the lower chamber 16 by virtue of the pressure of the flow of parts P which has reached its peak when the transfer aperture 20 was held in the lowermost position shown in FIG. 4.

Figure 6:
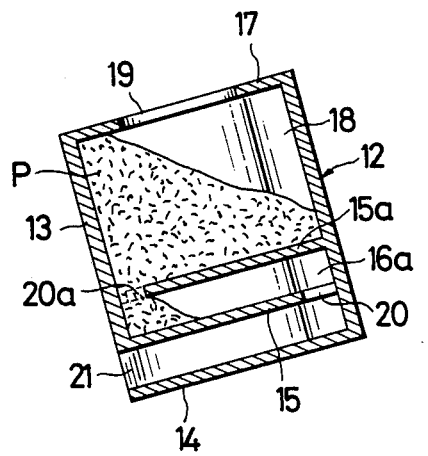
FIG. 6 is a longitudinal cross-sectional view of a modified form of hopper.

FIG. 6 shows a modification of hopper which is similar to the hopper 10 of FIG. 1 except that there is provided an additional partition wall 15a positioned above and defining with the partition wall 15 an intermediate chamber 16a for receiving parts P from the upper chamber 18 through a transfer aperture 20a located in registry with the discharge outlet opening 21; that is, in diametrically opposed relation to the transfer aperture 20 in the partition wall 15, the arrangement being that an ultimate amount of parts P to be discharged can be more accurately controlled.

Figure 7:
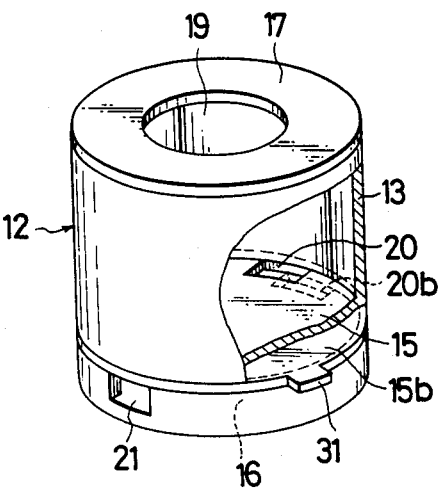
FIG. 7 is a perspective, partly cross-sectional, view of another modification of hopper.

Another modification shown in FIG. 7 is also substantially similar in construction to the hopper 10 of FIG. 1 except that there is provided an additional partition wall 15b located beneath and in sliding contact with the partition wall 15 and having a transfer aperture 20b identical with the aperture 20. The partition wall 15b is rotatable with respect to the partition wall 15, for which purpose there is provided a knob 31 projecting outwardly from the peripheral wall of the container 12 so as to be manipulated to rotate the partition wall 15b in either direction to adjust the effective dimension of the aperture 20 in the partition wall 15 thereby controlling the amount of parts P for entry into the lower chamber 16.

Figure 8:
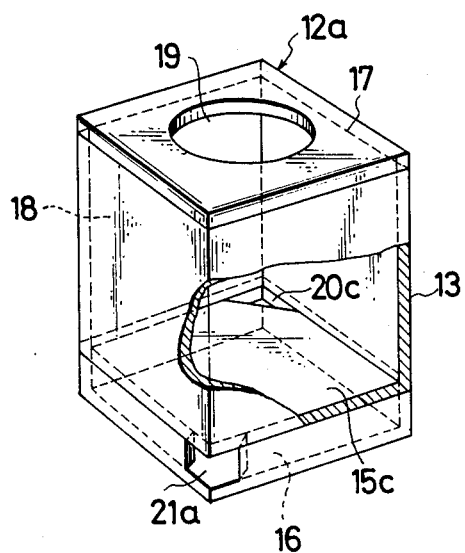
FIG. 8 is a perspective, partly cross-sectional, view of a further modification of hopper.

FIG. 8 illustrates a further modification of hopper which comprises a square box type container 12a with a square partition wall 15c, hence with square upper and lower chambers 18 and 16 and with the transfer aperture 20c positioned diagonally across the discharge outlet opening 21c. The transfer aperture 20c and the discharge outlet opening 21c are disposed at the diagonally opposite corners of the square box type vessel 12a.

In lieu of the air rotary actuator 27 for driving the container 12, there may be used electric or hydraulic motors in which instance the container 12 may be arranged to rotate unidirectionally continuously or intermittently as the case may be.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A parts supply hopper comprising:
   (a) a generally cup-shaped container rotatably disposed in an inclined plane with an open end facing upwardly and movable at least through an angle of 180 degrees about its own longitudinal central axis;
   (b) a partition wall disposed in said container and lying in parallel spaced relation to a bottom wall of said cup-shaped container so as to define, jointly with said container, a pair of upper and lower chambers disposed one on each side of said partition wall, said partition wall having a transfer aperture communicating between said upper and lower chambers; and
   (c) a peripheral wall of said cup-shaped container having a discharge outlet opening communicating with said lower chamber and located in diametrically opposed relation to said transfer aperture.

2. A parts supply hopper according the claim 1, said container being made of a transparent material.

3. A parts supply hopper according to claim 1, said lower chamber being considerably smaller than said upper chamber.

4. A parts supply hopper according to claim 1, said container having a generally cylindrical shape.

5. A parts supply hopper according to claim 1, said container having a generally square shape, said transfer aperture and said discharge outlet opening being disposed at diagonally opposite corners of said square-shaped container.

6. A parts supply hopper according to claim 1, further including an additional partition wall disposed in said upper chamber and extending parallel to said partition wall so as to define therebetween an intermediate chamber, said additional partition wall having a transfer aperture positioned diametrically opposite said transfer aperture in said partition wall and communicating between said upper chamber and said intermediate chamber.

7. A parts supply hopper according to claim 1, further including an additional partition wall rotatably disposed in said container immediately below said partition wall and having a transfer aperture locatable in registry with the transfer aperture in said partition wall.

8. A parts supply hopper according to claim 7, said additional partition wall having a knob projecting outwardly from said peripheral wall of said container.

* * * * *